United States Patent [19]
Pilston

[11] 3,832,798
[45] Sept. 3, 1974

[54] LURE CONTAINER

[76] Inventor: Robert G. Pilston, 1265 S. Bellaire, Denver, Colo. 80220

[22] Filed: June 1, 1973

[21] Appl. No.: 366,001

[52] U.S. Cl. .............................. 43/57.5 R, 224/5 R
[51] Int. Cl. ............................................ A01k 97/04
[58] Field of Search .................... 43/54.5 R, 57.5 R; 224/5 R, 5 G

[56] References Cited
UNITED STATES PATENTS
| | | | |
|---|---|---|---|
| 2,693,662 | 11/1954 | Norton et al...................... | 43/57.5 R |
| 2,718,087 | 9/1955 | Cheesebrew.................. | 43/57.5 R X |
| 2,762,157 | 9/1956 | Tompkins......................... | 43/57.5 R |

*Primary Examiner*—Robert Peshock
*Assistant Examiner*—Daniel J. Leach
*Attorney, Agent, or Firm*—Phillip L. DeArment

[57] ABSTRACT

A container having an elongated tubular transparent housing which envelops a lure suspended therein by a line connectable to a fisherman via a buttonhole, belt, auxiliary chain or necklace, etc. When access to the lure is desired, an access closure which closes the bottom of the housing is removed and the housing is moved upward along the line to expose the lure and line connector. After separation of the lure from the connector, the housing returns by gravity to its initial position, stopped by an abutment on the line connector engaging the container. A multiple lure container is also disclosed which provides a plurality of transparent plastic tubes open at one end and formed into an integral body. A hinged plastic transparent cover extends over and closes the upper open ends of the tubes. A shoulder strap supports the container on the user. By this arrangement visual access is provided to the interiors of the tubes.

5 Claims, 4 Drawing Figures

PATENTED SEP 3 1974 3,832,798

LURE CONTAINER

The present invention relates to containers for storing, handling and displaying fishing lures. Handling, storage and access to fishing lures, particularly plugs, have been a problem for the fisherman due to the hooks associated with the plugs. For example, the hooks of the lure tend to snag various objects and become entangled such that it takes time to extricate a selected lure for use.

The prior art provides several different types of containers for fishing lures which provide partial solutions to these problems. For examples of related prior art solutions to these problems, see U.S. Pat. Nos. 2,693,662, 2,718,087, 2,729,913, 3,180,053 and 3,224,134. However, the prior art, although solving part of the problem does not provide for individual storing of lures such as plugs which can be conveniently stored on the body of the fisherman, isolate the lures from the fisherman and can be easily manipulated to connect or disconnect a selected lure for use in fishing.

The present invention has as an object an inexpensive, lightweight lure container that can be readily attached to the fisherman and which supports a lure such as a plug in an individual envelop which protects the fisherman from the lure and the lure from damage and moisture when not in use and which is easily manipulated by the fisherman to permit access to the lure in the container to remove it for use and to replace it after the use is completed.

A further object of the present invention is to provide an elongated tubular container through one end of which a line extends for connecting to the lure to be contained and the other end of the line is connected to the fisherman, the container has a removable access cover on the opposite end such that the lure is completely suspended and stored within the elongated container during non-use and when it is desired to use the plug, the access opening cover is removed and the housing moved upward along the line to expose the connection between the lure and the line such that the lure can be readily disconnected.

These and other objects will become apparent from the following description of preferred embodiments of the invention taken in accordance with the accompanying drawings and in which.

Figure 1:
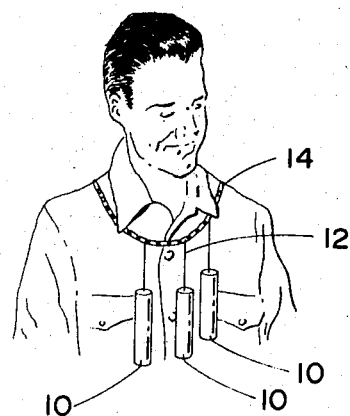
FIG. 1 is a perspective view of lure containers according to the present invention and showing the containers connected to a fisherman.
Figure 2:
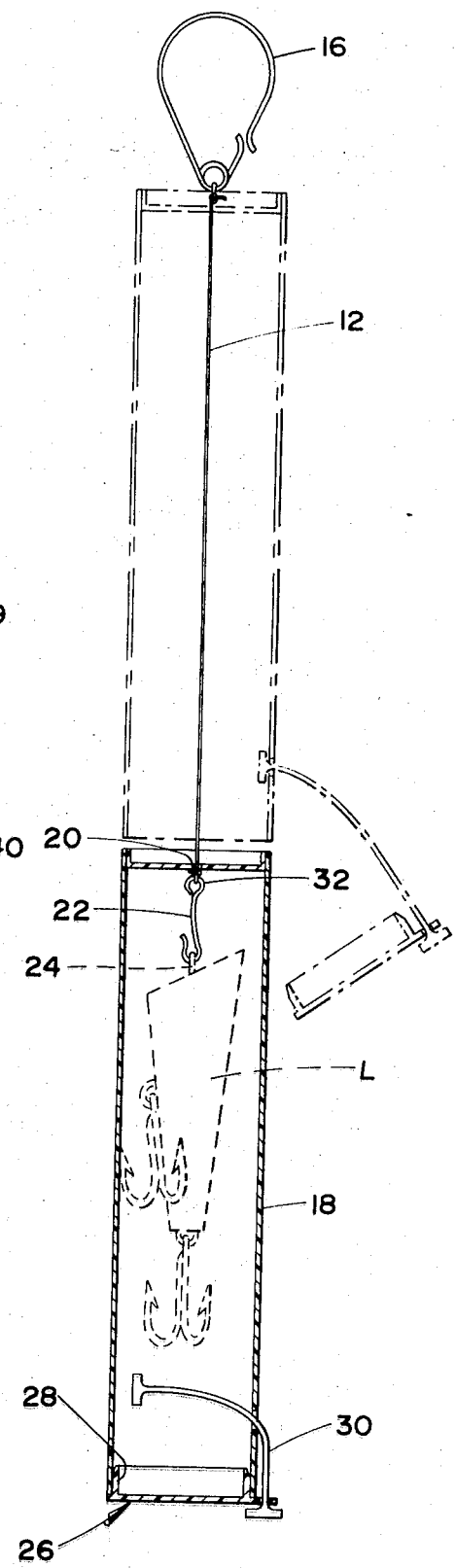
FIG. 2 is a perspective view of a lure container according to the present invention and showing in phantom the container opened and moved upward along the line to expose the line lure connector.

Referring to the drawings and initially to FIG. 1, lure containers 10 are illustrated connected by lines 12 to a necklace or belt 14. The belt or necklace 14 can either be placed around the fisherman's neck as shown in FIG. 1 or around his waist (not shown) to support the containers 10 during use. A suitable clasp or connecting device 16 (FIG. 2) connects one end of line 12 to the necklace or belt 14 such as a safety pin-type connector commonly used on a leader in fishing gear.

The container 10 comprises a transparent plastic body 18. The body 18 is of tubular configuration and is sized such that most lures such as plugs L can fit within the confines of the body 18 while permitting the body 18 to move relative to the plug with minimum interference. The upper end portion of the body 18 is closed except for a line access opening 20 to permit the line 12 to extend into the interior of body 18.

The line 12 extends through the access opening 20 into the interior of body 18 and includes means 22 for connecting the end of line 12 to the lure L. Means 22 may be a suitable snap-type fastener or equivalent and one such fastener found suitable for the purpose is the hook-type fastener (shown in FIG. 2). The connector 22 is adapted to engage an eyelet 24 provided on lure L and connect the lure L to the line 12.

The container 10 further includes an access means 26 which is configured to snugly engage and completely close the open end of body 18 to protect the lure L from moisture, dirt, etc. The access member 26 may assume various configurations. However, the preferred configuration is one of a cap having a depending portion or flange 28 which frictionally engages and closes the lower portion of the body 18. The friction fit holds the access member in secured relationship to the body 18. The access member 26 has a strap 30 which connects the access or closure member 26 to the body 18 such that when the access member 26 is removed, it does not become separated from the body 18. The strap 30 can be connected to the body and member 26 in a convenient manner.

The lure container 10 is adapted to contain, store, and visually display lure L while depending from necklace or belt 14 as shown in FIG. 1. When lure L is to be removed, the user removes access member 26 to open the bottom of the body portion 18. The body portion 18 is then moved upward along line 12 from a first position illustrated in full line in FIG. 2 in which the body portion envelops lure L to a second position illustrated in phantom in FIG. 2, wherein lure L and connector means 22 is exposed to enable the clasp 22 to be manipulated to separate the lure L from the line 12. After removal of lure L, the body portion 18 may be released and will move by gravity downward along line L until it engages abutment 32 provided by the connector 22. The abutment 32 engaging body 18 prevents empty body 18 from separating from the line 12. This operation is repeated to replace the lure in the container 10.

It should be apparent from the foregoing that a lure container is provided which can isolate and visibly display a lure in a manner convenient for use by the fisherman and which permits the lure to be easily removed from and returned to its container. Moreover, the construction of the container is such that it is relatively inexpensive to manufacture and is convenient to be supported by a fisherman while he is fishing without undue interference with the fishing operation. It should also be appreciated that container 10 provides a convenient manner of storing lures other than during time of use such as a package for sale of the lures.

Figure 3:
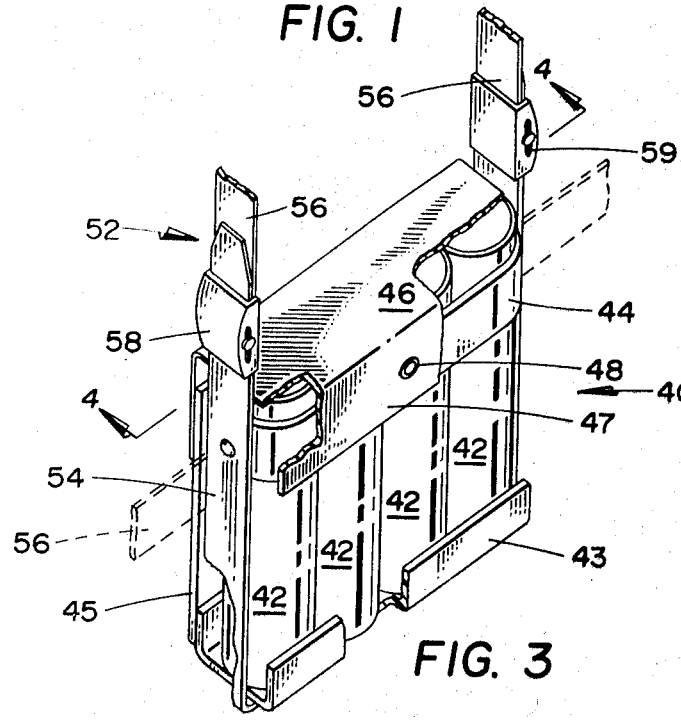
FIG. 3 is a perspective view of modified lure container which is capable of supporting a plurality of fishing lures in an integrated body.

A multiple-type lure container 40 is illustrated in FIG. 3. The container 40 comprises a plurality of open ended plastic tubes 42 which are closed at their bottoms by a U-shaped, plastic channel 43, to which the ends of tubes 42 are connected such as by bonding. The tubes 42 are supported at their top portions by a plastic band or strap 44 which at least partially surrounds the upper tube ends. The band 44 is secured to a back stiffening panel 45, which is suitably secured along one side of channel 43. The tubes 42 are sized such that a typical large lure can be disposed and supported completely in the tube. The upper ends of the tubes 42 are open to provide egress for the lures and are arranged relative to one another to provide visual access through each tube to the interior. A closure member 46 in the form of a transparent plastic flap is connected such as by bonding to the back panel 45. The cover member 46 is of a size that completely covers the open ends of tube 42 and has a depending flap 47 embodying a fastening member 48, such as a female snap, that cooperates with a male snap portion (not shown), disposed on strap 44 to effect closure of the tops of the tubes 42.

A carrying strap 52 includes a fixed belt portion 54 connected to the strap 44 for example, by riveting and a removable belt portion 56 connected to fixed belt portion 54 by buckles 58 and 59. Buckle 58 is secured to fixed portion 54 and buckle 59 is secured to removable portion 56. By this arrangement, the fisherman may use strap 52 as a shoulder strap as illustrated in full line in FIG. 3, or as a belt by separating belt portion 56 from belt portion 54 and threading belt portion 56 through the space between tubes 42 and panel 45 as illustrated in broken lines in FIG. 3.

It should be apparent that the lure container 40 provides visual access even when closed to all the lures stored in the individual plastic tubes 42. Moreover, the multiple lure container embodiment illustrated has as its object to utilize commercially available parts and thus reduce tooling and manufacturing costs with a view of obtaining a lower selling price.

However, where tooling costs and price are not a concern, the container 40 may be constructed in a different manner such as by molding or a combination of extruding the tubes and bonding them to one another and connecting a strap and cover directly to the bonded tubes. Such construction would reduce the number of parts used in the illustrated embodiment of FIG. 3.

Figure 4:
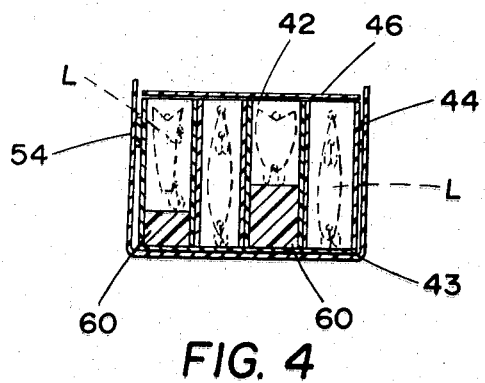
FIG. 4 is a partial sectional view taken approximately along line 4—4 of FIG. 3.

To conveniently store various length lures in the equal lengths tubes, inserts or filler plugs 60 (FIG. 4) of appropriate size may be inserted into the bottom of the tubes 42. These inserts support lures L substantially shorter than tubes 42 so that their forward ends are near the top of the tubes for ready accessibility. The inserts may be plastic tubes closed at one end and sized to fit conveniently inside tubes 42.

The container 40 may include various members and rows of tubes 42 and may be arranged in a straight line as illustrated in FIG. 3, or in an arc to conform generally to the shape of the fisherman's hip.

What I claim is:

1. A lure container adapted to be dependently supported from a fisherman to protect the fisherman from the hooks of the lure and protect the lure from damage and snagging other objects comprising a line having first means for connecting one end of the line to a support adapted to be attached to a user and second means for connecting the other end of the line to the fishing lure, and housing means for the lure having at least a portion thereof transparent to permit visual access to the interior of the housing and being of a size and configuration to completely receive and house the lure within the interior thereof so that said housing means can freely move relative to the lure, said housing means being supported for guided movement along said line from a first position wherein said housing means envelops and shields said second means and the lure to a second position wherein said second means and the connected lure are uncovered by said housing means to permit access to said second means, abutment means operatively associated with said second means and said housing means to prevent said housing means from moving from said second position beyond said first position and said housing means having access means selectively closing a portion of said housing means to form a complete envelop when said housing means is in said first position and preventing movement of said housing means from said first position to said second position and movable to open the envelope and permit movement of said housing means from said first position to said second position.

2. The lure container defined in claim 1, wherein said housing means includes a tubular-shaped body portion closed at one end except for an access opening for said line to enter the interior thereof and open at the opposite end, and said access means being of a size and configuration to completely close said opposite open end of said body portion and movable to open said body portion to permit the body portion to move to said second position to permit access to said second means such that the lure can be connected to or disconnected from said second means.

3. The lure container as defined in claim 2, wherein said entire body portion is transparent.

4. The lure container as defined in claim 2, wherein said access means is connected to said body portion by an elongated flexible strap which prevents detachment of said access means from said body portion.

5. The lure container in claim 2, wherein said access means includes a portion which frictionally engages a portion of said body portion defining said open end to hold said access means in position closing said open end of said body portion.

* * * * *